March 7, 1950 A. P. BOCK 2,499,716
INDUCTION HEATING EQUIPMENT
Filed Oct. 24, 1946 3 Sheets-Sheet 1

INVENTOR
Ashley P. Bock.
BY
B. L. Zangwill
ATTORNEY

March 7, 1950   A. P. BOCK   2,499,716
INDUCTION HEATING EQUIPMENT
Filed Oct. 24, 1946   3 Sheets-Sheet 2
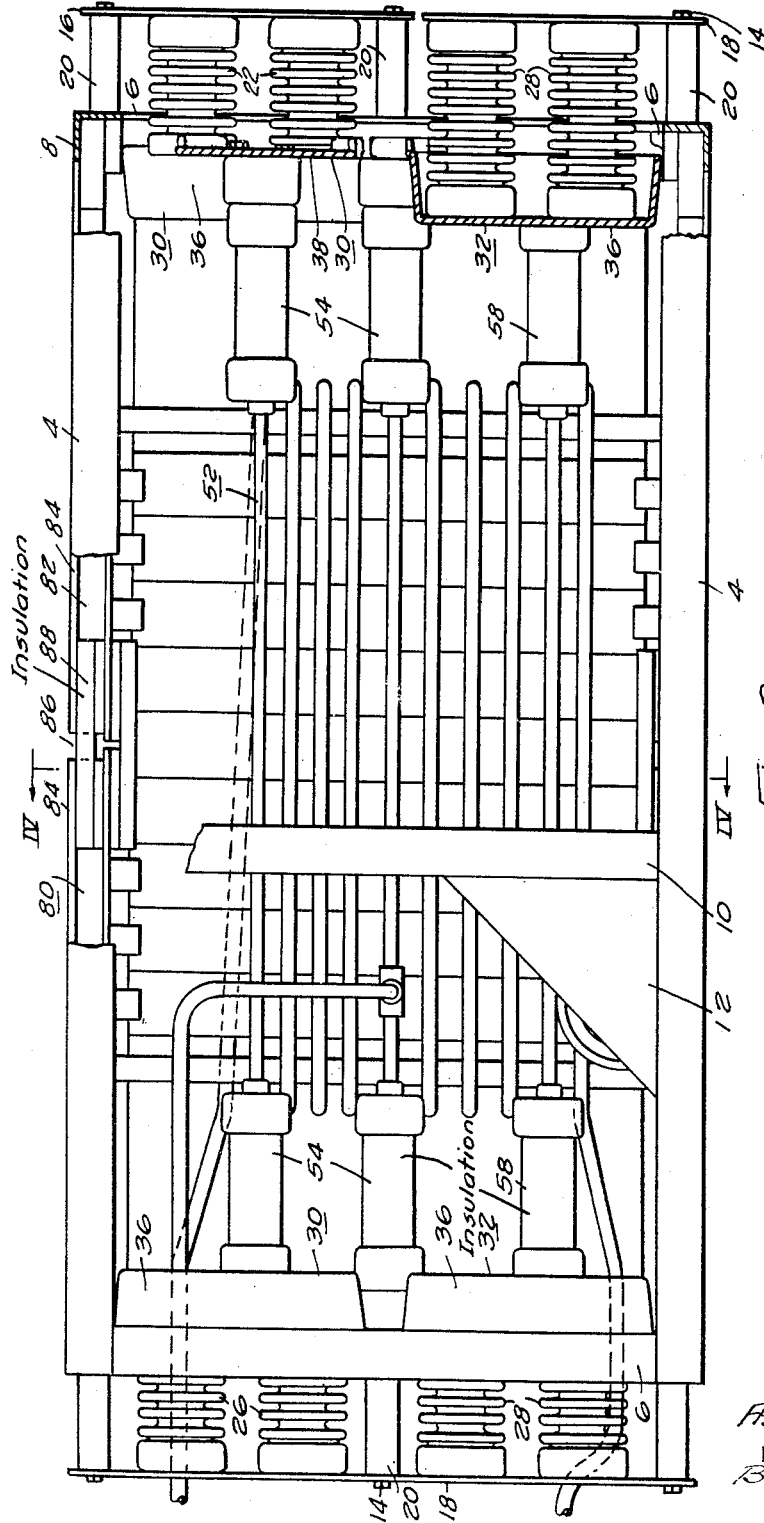
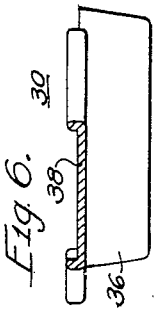
INVENTOR
*Ashley P. Bock.*
BY
*B. L. Zanquill*
ATTORNEY March 7, 1950

A. P. BOCK 2,499,716

INDUCTION HEATING EQUIPMENT

Filed Oct. 24, 1946

WITNESSES:
E. A. M'Closkey.
Thew. C. Groome

INVENTOR
Ashley P. Bock.
BY
B. L. Zangwill
ATTORNEY

Patented Mar. 7, 1950

2,499,716

UNITED STATES PATENT OFFICE 2,499,716

INDUCTION HEATING EQUIPMENT

Ashley P. Bock, Catonsville, Md., assignor to Westinghouse Electric Corporation, East Pittsburgh, Pa., a corporation of Pennsylvania Application October 24, 1946, Serial No. 705,262

14 Claims. (Cl. 219—47)

More particularly, my invention relates to induction heating coils which are capable of transferring considerable high-frequency power to one or more elongated, comparatively thin, electricity-conductive materials passing axially through the coils at comparatively high speeds such as are found in practical industrial processes.

While not limited thereto, an application in which my invention is useful is the recently developed induction heating system for the flowing of the tin coating on tin plate for improving its resistance to corrosion. Induction heating apparatus for such use is described in Patent Nos. 2,381,323; 2,381,274; 2,381,246 and 2,381,057, all of which were issued August 7, 1945. These patents also set forth several of the factors that require consideration in the building of a satisfactory induction heating coil of the multi-turn single-layer type operated with high voltages and high current. Many other applications require exceptionally high high-frequency currents in order to quickly and efficiently heat travelling material at the required rate by the transfer of energy through the medium of a rapidly pulsating magnetic field.

In such applications, the power demand can be so great that it cannot be supplied by a single tube-oscillator generator, and it becomes necessary to use several coils in tandem for heating the travelling material, with each coil separately energized by a separate tube-oscillator generator of high capacity. In such systems, each generator should take its allotted share of the heating load. However, the loading of an induction heating coil affects its electrical characteristics as reflected in the circuits of the tube-oscillator generator to which it is connected. As the strip passes successively through the induction heating coils, it becomes progressively hotter and changes its resistivity. Accordingly, each coil heats a portion of the strip having a higher resistivity from that heated by a preceding coil. In order to suitably apportion the load among the tube-oscillator generators, it is desirable to provide each induction heating coil with an adjusting means. Accordingly, it is an object of my invention to provide an induction heating coil for use in systems of a type described which is compact and rugged and on which fine adjustments can be made.

A further object of my invention is to provide an induction heating coil having means enabling the turns of the coil to be individually adjusted in an easy manner, so that it can be readily adapted for efficient operation for any use to which it is suited.

A still further object of my invention is to provide an induction heating equipment of a type described comprising a coil and a supporting structure therefor, in which the coil-turns are insulatedly supported by a plurality of insulators so arranged as to provide a high current-leakage path between different parts of the coil and from any part of the coil to its main supporting structure. Consequently, the supporting structures can be made of inexpensive but strong metal.

Other objects, features, combinations, subcombinations and elements of my invention will be discernible from the following description of a preferred form thereof to which, however, I am not limited. The description is to be taken in conjunction with the accompanying drawings in the figures of which some parts have been omitted for clarity. In the drawings:

Fig. 2 is a view with the left hand part in elevation and the right hand part in section along the line II—II of Fig. 3, and with outer parts broken away, of the equipment;

Figure 4:
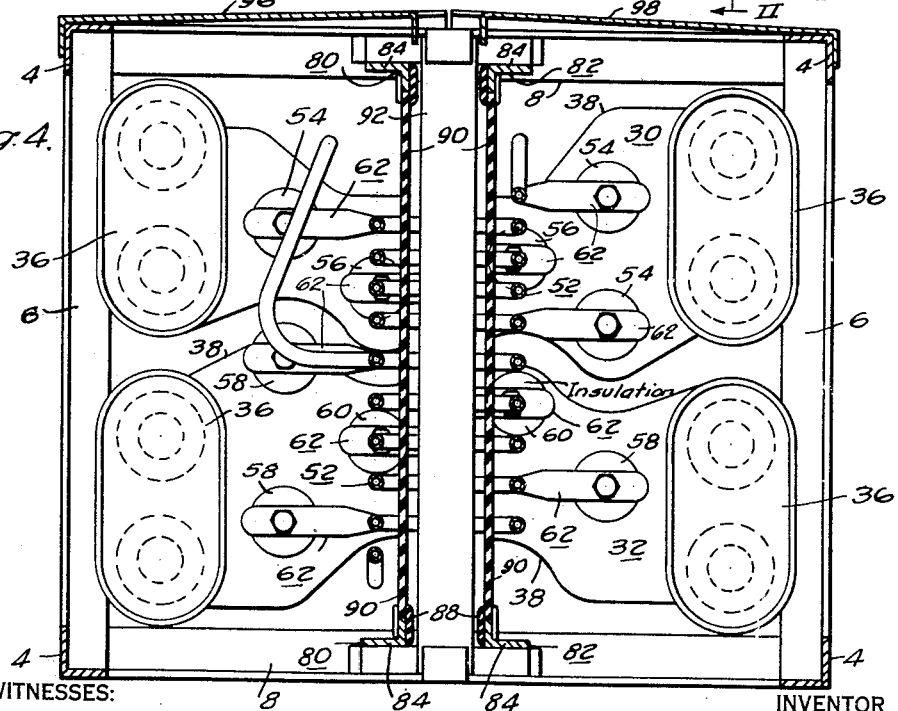

Fig. 4 is a vertical sectional view centrally through the equipment on a plane substantially along the lines IV—IV of Fig. 2; and Figs. 5 and 6 are lengthwise and crosswise sectional views, respectively, of a support-member utilized in the invention, having a central portion which is adapted to carry insulators that carry turns of the induction heating coil, and having cups at each end adapted to receive insulators that support the support-member, the last insulators being secured to the main frame or support-structure.

An induction heating equipment which embodies the teachings of my invention is shown in the drawings in some detail because this apparatus is in the form which I now prefer, but it is to be understood that my invention is not necessarily limited thereto nor to the exact details shown and described herein.

The equipment consists of an outer coil-supporting frame comprising an openwork main support-structure which can be said to be in the outline of a rectangular prism having sides or faces elongated in one horizontal direction. As arranged in the drawings, the main support-structure comprises elongated vertical sides including or bounded by metal bar-work having relatively longer horizontal edge-bars 4 and shorter vertical edge-bars 6, elongated horizontal sides including the edge-bars 4 and shorter horizontal edge-bars 8, and narrow vertical sides or ends including the edge-bars 6 and 8. Preferably the edge-bars are channels or angles. Additional reinforcing bars 10 and gussets 12 may be provided along sides of the main support-structure.

Much of the structure at each of the narrow vertical sides or ends of the equipment is generally the same so that the following description of the structure found at one of these ends is applicable to the other end also.

Figure 1:
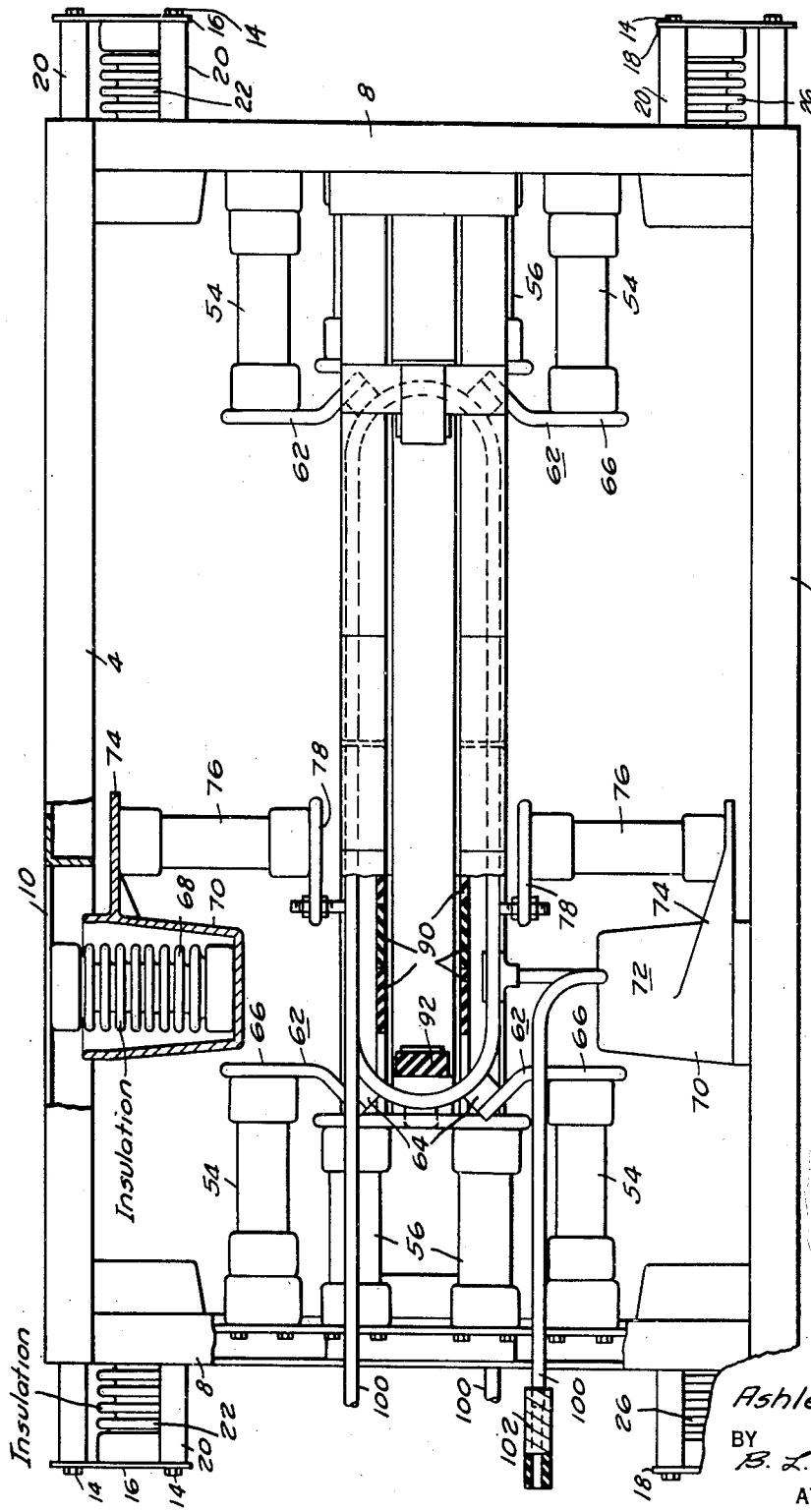
Figure 1 is a view partly in plan and partly in section looking downwardly on equipment embodying my invention, with the top of the supporting structure removed in order to more clearly illustrate the parts inside the equipment.
Figure 3:
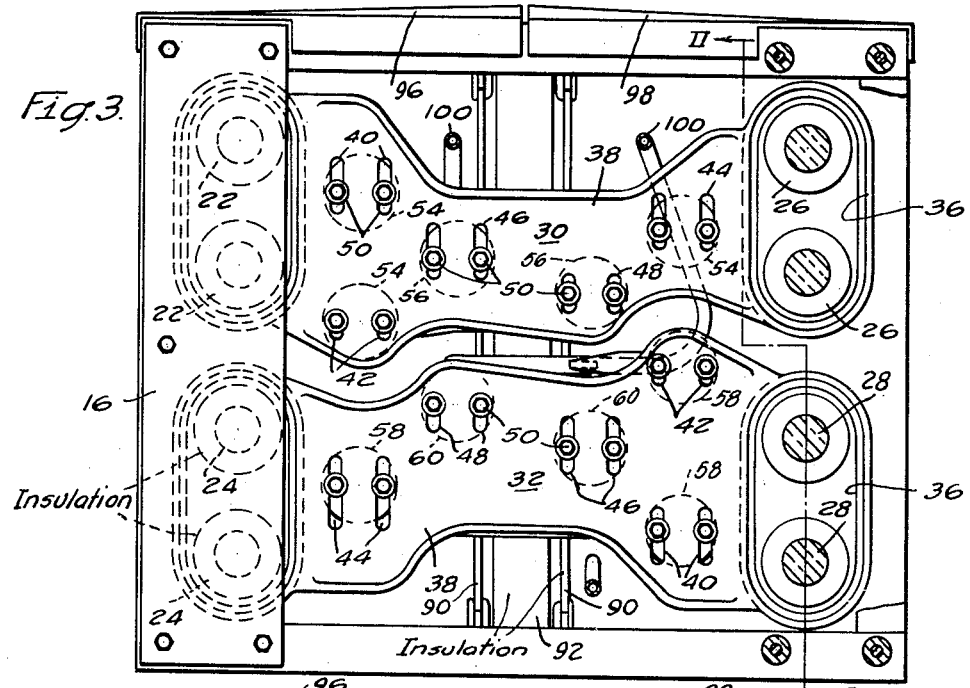
Fig. 3 is a vertical end view of the equipment with parts broken away and parts in section.

Referring more particularly to Fig. 3, and to the right-hand portions of Figs. 1 and 2, each vertical end of the equipment comprises two sets of vertically arranged bolts 14 which are fixed to and extend outwardly from the vertical edge-bars 6 and the horizontal bars 8 at such end. The sets of bolts 14 carry a pair of narrow vertical plates 16 and 18 which are horizontally spaced and are about the height of the equipment. Spacers 20, about the bolts 14, position the plates at a predetermined distance from the associated end of the main support-structure so as to provide a supporting spacer means for insulators and additional parts that carry an induction heating coil inside the main support-structure.

The vertical plate 16 of the spacer means supports a plurality of horizontally extending insulators which are vertically spaced, these insulators consisting of an upper set 22 and a lower set 24. Similarly, the vertical plate 18 of the spacer means supports insulators consisting of an upper set 26 and a lower set 28. The various sets of insulators secured to the plates 16 and 18 extend inwardly therefrom into the associated open end of the main support-structure, and clear of the vertical edge-bars 6.

At each end of the equipment, the inner ends of the upper insulator-sets 22 and 26 cooperate to carry a horizontal intermediate support-structure 30; and the inner ends of the lower insulator-sets 24 and 28 cooperate to carry a horizontal lower intermediate support-structure 32. Accordingly, the horizontal intermediate support-structures 30 and 32 are parallel and extend laterally across each end of the equipment inside the main support-structure. They are carried by the insulator-sets 22, 24, 26 and 28 which are in turn carried by the spacer means comprising the plates 16 and 18.

Each of the intermediate support-structures 30 and 32 may be a casting and comprises a support-member which is more particularly shown in Figs. 5 and 6. Each support-member has an oval cup-shaped portion 36 at each end, having slightly tapered walls and opening outwardly, and has a central portion 38 between the facing open ends of the cup-shaped portions. The inner ends of the insulators 22, 24, 26 and 28, inclusive, are anchored to the bottoms of the associated cup-shaped portions, there being two insulators in each cup-shaped portion.

The central portions 38 of the intermediate support-structures or support-members 30 and 32 are shaped in the manner shown in Figs. 3 and 4. Adjacent undulating edges of the two support-members have the same general contour, and the opposition or far edges having reversed contours, so that the support-members are, in general, enantiomorphous. Thus, with respect to Fig. 3, the left-hand side of the central portion 38 of the upper support-member 30 is similar to the right-hand side of the central portion 38 of the lower support-member 32, and each has a pair of vertically-spaced sets of vertical slots 40 and 42. Similarly, the other remaining sides of the central portions of the support-members 30 and 32 have single sets of slots 44, and the middle of the central portions are provided with sets of slots 46 and 48. The aforesaid slots are suitably arranged for adjustably receiving bolts 50 which can be tightly screwed into insulators which carry a plural-turn single-layer induction heating coil 52 of hollow flexible copper tubing.

The induction heating coil 52 is arranged with its axis vertical; and compared to its axial length, the coil is wide and narrow so as to be capable of heat-treating wide thin strips passed axially, or longitudinally, through it. The turn-ends of the coil are carried by a plurality of vertical rows of additional coil-carrying insulators which have ends secured to the support-members 30 and 32 at the associated ends of the equipment. The additional coil-carrying insulators extend horizontally inwardly from their support-members 30 and 32, being directed toward the center of the equipment in four vertical rows at each end of the main support-structure.

As is apparent from Figs. 1, 3 and 4, a support-member 30 carries longer coil-carrying insulators 54 for a pair of outer insulator rows; and shorter coil-carrying insulators 56 for a pair of shorter inner insulator rows. Similarly, the support-member 32 carries longer coil-carrying insulators 58 associated with the aforesaid pair of outer insulator rows, and shorter coil-carrying insulators 60 associated with the aforesaid pair of inner insulator rows. The ends of the insulators 54 and 58 of the outer rows are fastened to their respective support members by insulator securing means comprising fastener bolts 50 that pass through oversize outer slots 40, 42 and 44 of the support-members 30 and 32. Similarly, the ends of the inner-row insulators 56 and 60 are fastened to their respective securing members 30 and 32 by fastener bolts 50 that pass through oversize inner slots 46 and 48 of the support-members. Consequently, at each end of the equipment, an outer row of coil-carrying insulators consists of two insulators 54 carried by the upper support-member 30 and one insulator 58 carried by the lower support-member 32; the next inner insulator-row consists of one insulator 56 carried by the support-member 30 and one insulator 60 carried by the support-member 32. The next inner insulator-row consists of one insulator 60 carried by the support-member 30 and one insulator 56 carried by the support-member 32. Finally, the remaining outer insulator-row consists of one insulator 54 carried by the support-member 30 and two insulators 58 carried by the support-member 32. The different vertical insulator-rows are horizontally spaced, but the insulators thereof are horizontally out of line as shown in Figs. 3 and 4, being displaced so as to be associated with different turns of the induction heating coil 52.

Each coil-carrying insulator has a separate lug 62 which is connected to an end-turn of the induction heating coil 52. As is readily apparent from Figs. 1 and 4 each lug 62 has one end 64 brazed or otherwise secured to the associated end-turn and its other end 66 rigidly fastened to the associated insulator. The lugs on successive end-turns extend alternately to the left and right.

The positions of the insulators 54, 56, 58 and 60 can be individually changed or adjusted by individually adjusting the bolts 50 in the slots 40, 42, 44 and 46, that are associated with each insulator. Changing the position of any of these insulators, carried by the support-members of the intermediate support-structures, moves the associated end-turn of the induction heating coil, and changes the separation of that particular end-turn from any other end-turn which is not correspondingly moved. Consequently, the inductance of the coil can be adjusted as well as the degree of its coupling to the strip.

The induction heating coil can be supported with greater rigidity, where necessary, by adding a few coil-supporting insulating means at suitable points along the longer vertical sides of the main supporting-structure. Such additional insulating means comprises an insulator 68 having one end secured to the main support-structure and its other end bolted to the bottom of a cup-shaped portion 70 of an auxiliary intermediate support-structure 72, the insulator being inside the cup-shaped portion. The cup-shaped portion carries an arm 74 near its open face, to which is secured an end of an insulator 76 having its other end secured, through a lug 78, to a turn of the induction heating coil 52. The insulator 76 can be adjustably fastened to the arm 74 by bolt and slot expedients such as those provided for the insulators 54, 56, 58 and 60.

For apparatus of the type described, it is desirable to provide an insulating lining inside the coil in order to prevent the metal of the material being heat-treated from contacting the electrified turns of the coil. To this end a pair of spaced long horizontal bar-means 80 and 82 (Figs. 2 and 4) are provided centrally along the upper side and the lower side of the induction heating equipment, the bar-means being insulatedly secured to the shorter horizontal edge-bars 8. Each bar-means comprises a pair of lengthwise-aligned angle members 84 having facing edges separated by a space 86 for air-insulation. Two such angle members are shown separated at the middle of the coil and held together by means of a short insulating bar 88 spanning the space 86 between the channels. The insulating lining comprises a plurality of juxtaposed vertical insulating boards 90 secured to vertically aligned angle members 84, with the boards protruding beyond the ends of the coil. These insulating boards are spaced from the tubing forming the coil. Vertical insulating boards 92 are insulatedly supported along the narrow sides of the induction heating coil, inside the end-turns. Consequently, the boards 90 and 92 form an insulating liner inside the coil, the liner and coil having opposite openings through which strip to be heat-treated can be passed. While any suitable insulation material can be used, I prefer, at present, that sold under the tradename of "Mycalex."

It is also desirable to close, as far as permissible, the sides of the induction heating equipment which face in the direction from which the strip is coming. To this end, shields or closure plates 96 and 98 are provided at the entrance end of the induction heating coil, each covering about half of the top side of the equipment. These closure plates are separated from each other and are formed to provide a wide, narrow entrance opening or slot for the strip, as indicated at the top of Fig. 4. These closure plates are effective for catching any foreign particles flying from the surfaces of the strip or carried along by the windage action of the moving strip, so that the particles can not lodge on the coil.

Conductors 100 may be provided by means of which electricity is conveyed to and from the coil. In some cases it is desirable to interpose a stretch of an insulated tubing 102 in a connection to the coil for feeding cooling water. Such stretch might be rubber hose or "plastic" insulating material or any other suitable tubing having insulating properties.

With respect to the apparatus described, it may be noted that the insulators 22, 24, 26 and 28 carried by the outside plates 16 and 18 overlap the insulators 54, 56, 58 and 60 carried by the intermediate support-structures or support-members 30 and 32, so that the overall horizontal length of the induction heating equipment is minimized. In addition, the leakage path from any portion of the coil to the main support-structure includes at least two insulators in series.

The intermediate support-structures comprising the support-members 30 and 32 are themselves insulated from the remaining portions of the induction heating equipment, with the upper part of the coil insulatedly carried by the upper intermediate support-structures and the lower part of the coil similarly carried by the lower intermediate support-structures. If the electrical connections for the coil should be such that the largest voltage drop is across the ends of the coil, the construction disclosed provides a leakage path from one end of the coil to the other which includes a minimum of four insulators in series.

The individual adjustments for the insulators 54, 56, 58, and 60 permit very fine adjustments in the spacing between turns of the coil. Such fine adjustments are particularly desirable in systems in which the induction heating coil is, directly or indirectly, a part of the tank circuit of the tube-oscillator generator which delivers power to the coil.

While I have shown my invention in a specific form, it is obvious that this form has been selected to illustrate the teachings of my invention. It is obvious that other forms and details can come within the scope of my invention, and that the teachings of my invention can be embodied in various forms of induction heating coil-equipment or analogous equipment.

I claim as my invention:

1. Induction heating equipment comprising, in combination, a plural-turn single-layer induction heating coil having a longitudinal axis; coil-supporting means comprising a support-member laterally spaced from said induction heating coil, a plurality of insulators, and insulator securing means securing said plurality of insulators to said support-member; said insulators having ends provided with lugs attached to different turns of said induction heating coil and other ends attached to said insulator securing means; said insulator securing means comprising adjusting means cooperating with said support-member for independently changing the position of an insulator so that the spacing between turns of the induction heating coil can be changed; said induction heating coil and said coil-supporting means having unobstructed openings through which material may be passed for induction heating by said induction heating coil.

2. Induction heating equipment comprising, in combination, a plural-turn single-layer induction heating coil; supporting means comprising a main support-structure and an intermediate support-structure spaced from said induction heating coil; a plurality of insulators attached to different turns of said induction heating coil; means for adjustably carrying said plurality of insulators on said intermediate support-structure for changing the space between turns of said induction heating coil; insulating means for insulatedly supporting said intermediate support-structure from said main support-structure; said induction heating coil and said supporting means having openings through which material may be passed for induction heating.

3. Induction heating equipment for heating material moving through the equipment, comprising in combination, a plural-turn single-layer induction heating coil; supporting means comprising a main support-structure and a plurality of separate, relatively-insulated support-members; a plurality of insulators attached to different turns of said induction heating coil; fastening means for carrying a number of said plurality of insulators on each of said support-members; and means comprising a plurality of insulators for insulatedly supporting a number of said support-members from said main support-structure; said insulators and support-members being carried in said induction heating equipment so as to be out of the path of said material.

4. Induction-heating equipment comprising, in combination, a plural-turn single-layer induction heating coil, supporting means comprising a main support-structure and a plurality of relatively-insulated support-members spaced from said induction heating coil, a plurality of insulators attached to different turns of said induction heating coil, fastening means for carrying a number of said plurality of insulators for a particular portion of said induction heating coil on each of said support-members, and means for insulatedly securing said support-members to said main support-structure.

5. Induction heating equipment comprising, in combination, a plural-turn single-layer induction heating coil, said coil being relatively wide and narrow; a main frame about said induction heating coil, having open narrow sides; said induction heating coil and said frame having passages through which material may be passed for induction heating; a spacer means extending outwardly from each narrow side of said frame; an insulator means secured to each of said spacer means, said insulator means comprising insulators extending into said main frame, with their ends spaced from said induction heating coil; a support-member carried by each of said insulator means; and insulators carried by said support members, each of the last said insulators carrying lugs secured to different turns of said induction heating coil, said insulators comprising a pair of axial rows of insulators having their lugs similarly arranged.

6. Induction heating equipment comprising, in combination, a plural-turn single-layer induction heating coil having a longitudinal axis, and relatively wide and narrow turns; a main frame about said induction heating coil, having open narrow sides; said induction heating coil and said frame having passages through which material may be passed for induction heating; a plurality of separate spacer means extending outwardly from each narrow side of said frame, comprising plates extending longitudinally in a direction generally corresponding to the axis of said induction heating coil; insulating means secured to each of said plates, and extending into said main frame; a plurality of separate relatively-insulated support-members at each narrow side of said main frame, carried by said insulating means; each of said support-members extending laterally with respect to said plates; and a plurality of insulators secured to each of said support-members for carrying said induction heating coil.

7. Induction heating equipment comprising, in combination, a plural-turn single-layer induction heating coil, supporting means comprising a main support-structure and an intermediate support-member spaced from said induction heating coil, said intermediate support-member comprising a cup-shaped portion and a second portion, an insulator having an end attached to said coil, an insulator having an end attached to said main support-structure, said insulators having their other ends secured to said intermediate support-member, with one of said insulators extending inside of said cup-shaped portion.

8. Induction heating equipment comprising, in combination, a plural-turn single-layer induction heating coil; supporting means comprising a main support-structure; means for supporting said induction heating coil inside of said main supporting structure, with the space between turns of the induction heating coil adjustable, said means comprising an intermediate support-member, an insulator having an end attached to said coil, and an insulator having an end attached to said main support-structure, said insulators having their other ends secured to said intermediate support-member; one of said insulators being adjustable with respect to said intermediate support-member.

9. Induction heating equipment comprising, in combination, a plural-turn single-layer induction heating coil, the turns being relatively wide and narrow; a main frame about said induction heating coil, said frame having open narrow sides; said induction heating coil and said frame having passages through which material may be passed for induction heating; a spacer means extending outwardly from each narrow side of said frame; an insulating means secured to each of said spacer means and extending into said main frame, said insulating means comprising a plurality of insulators, a plurality of support-members inside said main frame, each comprising a cup-shaped portion and a second portion; each of said insulators being secured in a cup-shaped portion of one of said support-members; and insulator means comprising insulators secured to said second portion of said support-members and to different turns of said induction heating coil.

10. High-frequency apparatus comprising, in combination, a single-layer coil having a plurality of spaced air-insulated turns, a support-member comprising a cup-shaped portion and a second portion, a first insulator secured to said cup-shaped portion on the inside thereof, a second insulator secured to said second portion, said first and second insulators extending in opposite directions, and a turn of said coil being attached to said second insulator.

11. High-frequency apparatus comprising, in combination, a single-layer coil having a plurality of spaced air-insulated turns, a support-member comprising a flat-walled central portion and a cup-shaped portion at opposite sides of said central portion, a plurality of insulators secured inside said cup-shaped portions, and a plurality of insulators adjustably secured to said central portion, said coil having turns secured to the last said insulators.

12. High-frequency apparatus comprising, in combination, a single-layer coil having an axis and comprising a plurality of spaced air-insulated turns, a plurality of relatively insulated support-members, each comprising a central portion and end portions at opposite sides of said central portion, said support-members being arranged in side by side relation in a direction corresponding to that of the axis of the coil, a row of insulators secured at each side of said central portions of said support-members, a side of said coil extending into the space between said rows of insulators, means for securing the insulators of said rows to proximate portions of said coil, and insulators secured to said end portions, extending therefrom in a direction opposite to that of said rows of insulators.

13. A single layer induction heating coil comprising a plurality of turns, said induction heating coil having a central passage through which elongated material can be progressively passed, said coil being relatively wide and narrow, a pair of insulators at each of the narrow sides of a plurality of turns of said induction heating coil, each insulator being secured to a turn of said induction heating coil, and means for independently adjusting said insulators for adjusting the spacing between turns of said induction heating coil.

14. A single layer induction heating coil comprising a plurality of turns, said induction heating coil having a central passage through which elongated material can be progressively passed, said coil being relatively wide and narrow, a plurality of insulators at opposite sides of said induction heating coil, each insulator being secured to a turn of said induction heating coil, means for independently adjusting said insulators for adjusting the spacing between turns of said induction heating coil, a support-member for a plurality of the insulators at one portion of said induction heating coil, a second support-member for a plurality of the insulators at a second portion of said induction heating coil, a main support, and separate insulating means for carrying each of said support-members from said main support.

ASHLEY P. BOCK.

REFERENCES CITED

The following references are of record in the file of this patent:

UNITED STATES PATENTS

| Number | Name | Date |
|---|---|---|
| 1,811,213 | Rohn | June 23, 1931 |
| 1,861,869 | Long | June 7, 1932 |
| 2,202,758 | Denneen et al. | May 28, 1940 |
| 2,381,246 | Baker et al. | Aug. 7, 1945 |
| 2,381,274 | Frostick et al. | Aug. 7, 1945 |